United States Patent [19]

Ito

[11] Patent Number: 4,741,477
[45] Date of Patent: May 3, 1988

[54] AIR-CONDITIONING CONTROL APPARATUS

[75] Inventor: Akinori Ito, Furukawa, Japan

[73] Assignee: Alps Electric Co., Ltd., Japan

[21] Appl. No.: 8,621

[22] Filed: Jan. 29, 1987

[30] Foreign Application Priority Data

Apr. 25, 1986 [JP] Japan .............................. 61-61708[U]

[51] Int. Cl.$^4$ ............................................... B60H 1/02
[52] U.S. Cl. ................................... 237/12.3 A; 74/97; 98/2.05
[58] Field of Search ...................... 237/12.3 A, 12.3 B, 237/12.3 R, 28; 98/2, 2.05, 2.08; 165/42, 43; 74/96, 97

[56] References Cited

FOREIGN PATENT DOCUMENTS 185620 9/1985 Japan ...................................... 237/28
206712 10/1985 Japan ...................................... 237/28

Primary Examiner—Henry A. Bennet
Attorney, Agent, or Firm—Guy W. Shoup

[57] ABSTRACT

An air-conditioning control apparatus for an automobile, in which an angle of opening and closing an air-mixing door is varied to thereby set a temperature of output air, has an operating lever formed with a switch operating portion for switching an intake door and a pin insert groove. The operating lever is coupled to a traction lever formed with an engaging portion with which is engaged a wire for driving the air-mixing door and a guide groove facing to the pin insert groove. A pin member is inserted between the pin insert groove and the guide groove, a first spring for urging the pin member toward one end of the pin insert groove, and a second spring for urging the traction lever toward the closing position of the door.

5 Claims, 10 Drawing Sheets

AIR-CONDITIONING CONTROL APPARATUS

BACKGROUND OF THE INVENTION

1. Field of the Invention

The present invention relates to an air-conditioning control apparatus provided on an automobile or the like, and more particularly to an air-conditioning control apparatus capable of setting a temperature to a level as desired by varying an opening and closing angle of an air-mix door.

2. Description of the Prior Art

FIG. 6 is a schematic view for explaining a general air-conditioner provided on an automobile.

As shown in FIG. 6, various doors of which functions are different from each other are provided within the air-conditioner. First, switching of internal and external air is carried out by an intake door 2 which selects whether in-vehicle air or out-vehicle air is used for air taken into the air-conditioner. The air having passed through the intake door 12 is fed to an evaporator 14 by means of a fan motor 13. The evaporator 14 has the function to forcibly cool the thus feed air to delivery the same. The air having passed through the evaporator 14 is divided into one which is used as cool air and the other which is heated by a heater core 15 for use as hot air. The cool air and hot are mixed later on to form air having a moderate temperature. The air mixing door 11 is provided in order to determine a ratio of mixture between the cool air and hot air. Accordingly, air having the desired temperature is obtained by the opening and closing state of the air mixing door 11. The thus obtained air is then fed to a venting door 17, a floor-door 18 and a def-door 19. The respective blowing openings are selected according to the opening and closing state of these doors 17, 18 and 19, and the air having a moderate temperature is obtained through the selected blowing opening.

Various doors are provided on the air-conditioner for an automobile as described above. Among these doors, the intake door 12, venting door 17, floor-door 18 and def-door 19 will merely suffice to be either opened or closed but only the air-mixing door 11 is required for its various opening and closing states. Therefore, the door 11 is required to perform the continuous opening and closing operation.

FIG. 7 is a perspective view showing a prior art example of a driving device for the air-mixing door, in which figure, reference numeral 20 designates an L-shaped lever, and 21 designates a wire.

In FIG. 7, the lever 20 is pivotable in a direction as indicated by arrow A—A around a pivot 20b whilst the air-mixing door 11 is pivotable in a direction as indicated by arrow B—B around a pivot 11a, a wire 21 being extended between an end 20c of the lever 20 and the air-mixing door 11. Accordingly. when an operating portion 20a provided on one end of the lever 20 is moved in a direction as indicated by arrow A—A by a finger, this movement is transmitted to the air-mixing door 11 through the wire 11 so that the air-mixing door 11 may be rotated through an angle as desired in correspondence to the amount of movement of the lever 20.

The operation of the conventional air-conditioning control apparatus provided with the lever 20 as described above is illustrated in FIGS. 8 through 10.

FIG. 8 shows the state wherein the door 11 is fully opened and the door 12 is opened toward the outside-air introducing side, FIG. 9 the state wherein the door 11 is fully opened and the door 12 is opened towards the outside introducing side, FIG. 10 the state wherein the door 11 is fully opened and the door 12 is opened toward the inside air introducing side, respectively.

Referring to FIGS. 8 through 10, the lever 20 is specifically composed of an operating lever 22, a traction lever 23 and a cam plate 24, the operating lever 22 being pivotable relative to a pivot 25, the traction lever 23 being pivotable relative to a pivot 26. The operating lever 22 is formed into an inverted L-shape on the whole in plane. At the end of a portion on the long side of the lever 22 is provided a slidable slide 26 along a slide groove 25 formed in the air-conditioning apparatus body 1 and guide grooves 22a and 22b being bored therein, whereas at the end of a portion on the short side of the lever 22 is formed with a switch operating portion 22c which depresses an operating switch 12a of the intake door 12. The traction lever 23 is also formed into an inverted L-shape in plane and has an engaging portion 23a with which the wire 21 is engaged, an insert hole 23b bored externally of a shaft 26 on the opposite end, and a projection 23c projected in the middle portion. The cam plate 24 transmits the pivotal operation of the operating lever 22 to the traction lever 23, the cam plate 24 comprising a guide groove 24a having an L-shape on the whole inserted into the projection 23c, an insert hole 24b externally of the shaft 25, and a projection 24c inserted into the guide groove 22a. A wire spring 27 is provided between the upper surface of the operating lever 22 and the projection 23c of the traction lever 23 to always urge the traction lever 23 in a direction as indicated by arrow C in FIG. 8.

Next, the interrelationship between the aforementioned three elements and the operation thereof will be described hereinafter.

The traction lever 23 is pivotably mounted on the shaft 26 through the insert hole 23b formed to have a larger diameter than that of the shaft 26, and the projection 23c is loosely fitted into the guide groove 24a of the cam plate 24. The insert hole 24b formed in the cam plate 24 is also formed to have a larger diameter than that of the shaft 25 and is loosely fitted rotatably into the shaft 25 in consideration of a clearance to some extent. The projection 24c is inserted into the guide groove 22a of the operating lever 22, and may be moved along the guide groove 22a. With the structure of three elements as described above, the operation of the operating lever 22 is transmitted to the cam plate 24 through the projection 24c, and the operation of the cam plate 24 is transmitted to the traction lever 23 through the guide groove 24a.

More specifically, in the state as shown in FIG. 8, the traction lever 23 pulls the wire 21 at its maximum, and therefore the air mixing door 11 is also opened to guide the introduced outside air as hot air toward the vehicle rooms through the heater core 15. When the operating knob 28 projected frontwardly of the air-conditioning control apparatus body 1 is moved in a direction as indicated by arrow D from the aforesaid state, the slide 26 linearly moves along the slide groove 25 and the operating lever 22 pivots in a direction as indicated by arrow E relative to the shaft 25. At that time, the end of the operating lever 22 linearly moves and the operating lever 22 body pivots, and therefore the radius of the pivotal movement varies according to the pivotal angle and the operating lever 22 is rotated while being moved in a direction as indicated by arror F along the guide groove 22b. During this pivotal movement, the cam plate 24 is pivotally moved in a direction as indicated by arrow E (clockwise in the figure) while the projection 24c is moving within the guide groove 22a.

When the cam plate 24 is pivotally moved in the direction of arrow E, the internal wall of the guide groove 24a pushes the projection 23c of the traction lever 23 to turn the traction lever 23 similarly in the direction of arrow E. Thus, the air-mixing door 11 is actuated in the closing direction by the wire 21. When the operating knob 28 is made to slide up to the position of FIG. 9, the air-mixing door 11 is completely closed. At this time, the projection 23c moves along the internal wall portion of the cam groove 24a till it reaches the neighborhood of the top 24d of the bended portion. When the knob is further slidably moved in the direction of arrow D from the position of FIG. 9, the traction lever 23 maintains its rotational angle, and the operating lever 22 and the cam plate 24 are further pivotally moved in the direction of arrow E. With this, the pressing portion 22c comes into contact with the operating switch 12a to force the end of the switch 12a into the apparatus body 1 to turn on the operating system of the intake door 12. When the operating system is turned on, the intake door 12 is switched from the outside air introducing side to the inside air introducing side to interrupt the introduction of the outside air.

In the above-described air-conditioning control apparatus, mostly the driver operates the operating knob 28 and often operates the knob during the travel. Therefore, a sort of a position recognition function is demanded so that the operator may definitely judge the heater mode from the position of FIG. 8 to the position of FIG. 9 (only during this mode, the air-mixing door 11 is open, and the outside air according to the opening degree thereof passes through the heater core 15 to render the heater effective) and the recirculation mode wherein air is circulated only within the vehicle compartments. In order to provide this function, the guide groove 24a is formed into an L shape, and the operating force increases at a position in which the projection 23c gets over the top 24c. That is, as shown in FIG. 11a, it relatively moves in the direction of arrow G from the position of the projection 23c corresponding to FIG. 8 to a position of FIG. 11b corresponding to FIG. 9. At that time, the projection 23c is positioned immediately before the top 24d to increase the operating force, thus finishing the heater mode.

Next, when further moving from the FIG. 9 position in the direction of arrow D, the cam plate 24 is also rotated in the direction of arrow E and the top 24c of the guide groove 24a comes into contact with the side of the projection 23c to press the latter. Then, the cam plate 24 is slightly moved in the direction of arrow C since the insert hole 24b is formed to have a larger diameter than that of the shaft 25. On the other hand, the traction lever 23 is slightly moved in the direction of arrow H since the insert hole 23b is formed to have a larger diameter than that of the shaft 26, and the projection 23c gets over the top 24d as shown in FIG. 11c and reaches the groove on the Q side. The traction lever 23 maintains the same position on the whole and assumes the state as shown in FIG. 10 and FIG. 11d to effect the aforementioned operation of the intake door 12.

In the aforementioned prior art, in order that the heater mode (the operating zone in connection with the air-mixing door 11) and the recirculation mode (the non-operating zone in connection with the air-mixing door 11) may be definitely discriminated from each other, the guide groove 24 is formed into an L shape on the whole, and the operating force increases in the vicinity of the top 24d of the guide groove 24a. When the great operating force is further applied, the cam plate 24 and the traction lever 23 are relatively deviated so as to get over the top 24d. This is the mechanism employed because the projection 23c is secured to the traction lever 23. In this mechanism, since the cam plate 24 and the traction lever 23 are relatively deviated a dimensional allowance is provided between the shafts 25 and 26 and between the insert holes 24b and 23b as mentioned above. This allowance is recognized as a play when the operating knob 28 is operated, which leads to a cause for injuring the operating feeling. Particularly, this play poses a problem when the operating knob 28 is operated from the fully open state to the closed state in FIG. 8

As may be understood from FIG. 6, in the fully open state, the air-mixing door 11 is urged toward the opening side by pressure of the outside air introduced from the outside, and therefore even if the operating knob 28 is operated toward the closing side, the traction lever 23 cannot be actuated unless the play resulting from the aforesaid dimensional allowance has been completely absorbed. Accordingly, the lever is lightly actuated up to the position in which the play is overcome, and from the position in which the play has been overcome, the operating force for opening the air-mixing door 11 against the air pressure increases, thus deteriorating the operatability. In addition, there arises the case where the sliding amount of the operating knob 28 and the opening degree of the air-mixing door 11 do not correspond to each other in the ratio of 1:1, thus posing a problem that the fine adjustment of temperature is difficult to make.

SUMMARY OF THE INVENTION

It is therefore an object of the present invention to provide an air-conditioning control apparatus which is excellent in operability and easy in fine adjustment of temperature.

For solving the problems involved in prior art and achieving the aforesaid object, the present invention provides an air-conditioning control apparatus to which are set a heater mode for controlling an angle of opening and closing an air-mixing door to adjust a ratio of mixture of hot air and cool air and a recirculation mode for switching an intake door to recirculate only air within a vehicle compartment, wherein an operating lever is operated to select both said modes and adjust the mixture ratio. The apparatus includes an operating lever formed with a switch operating portion for actuating switch means to switch the intake door and a pin insert groove, said operating lever being pivotably supported, a traction lever having a guide groove provided at a position facing said pin insert hole in a state wherein an operating portion and a non-operating portion are bent and an engaging portion with which is engaged a wire for driving the air-mixing door, said traction lever being pivotably supported on the side at a distance from said engaging portion, a pin member inserted between said pin insert groove and said guide groove to connect the operating lever with the traction lever, first urging means for always urging said pin member in a direction at a distance from the center of the pivotal movement of said operating lever, and second urging means for urging said traction lever in a direction of closing the air-mixing door.

According to the above-described arrangement, a guide groove having an operating portion and a non-operating portion, a pin member which is slidably moved in the guide groove and an urging means for urging the pin member constitute a position recognition mechanism, in which the operating lever is operated to move the pin member from the operating portion getting over the top of the non-operating portion against the urging force of the urging means to obtain a position recognition function. With this construction, a clearance need not be anticipated in advance into the pivotally moving portions of the operating lever and the traction lever, and therefore, no play occurs during the operation, and the operating force of the operating lever is stabilized. In addition, the operating amount of the operating lever and the opening degree of the air-mixing door may be corresponded to each other in the ratio of 1:1.

BRIEF DESCRIPTION OF THE DRAWINGS

FIGS. 1 to 5 illustrate embodiments according to the present invention; in which FIGS. 1, 2 and 3 are respectively plan views showing essential parts of an air-conditioning control appartus, and FIGS. 4 and 5 illustrate the principle of operation showing the moving state of a pin within a guide groove; and FIGS. 6 to 11 illustrate prior art, in which FIG. 6 is a sectional view schematically showing a general air-conditioner for an automobile, FIG. 7 schematically illustrates a conventional manually-operated air-conditioning control apparatus, FIGS. 8, 9 and 10 are respectively plan views showing essential parts of a conventional air-conditioning control apparatus.

DESCRIPTION OF THE PREFERRED EMBODIMENTS

Figure 1:
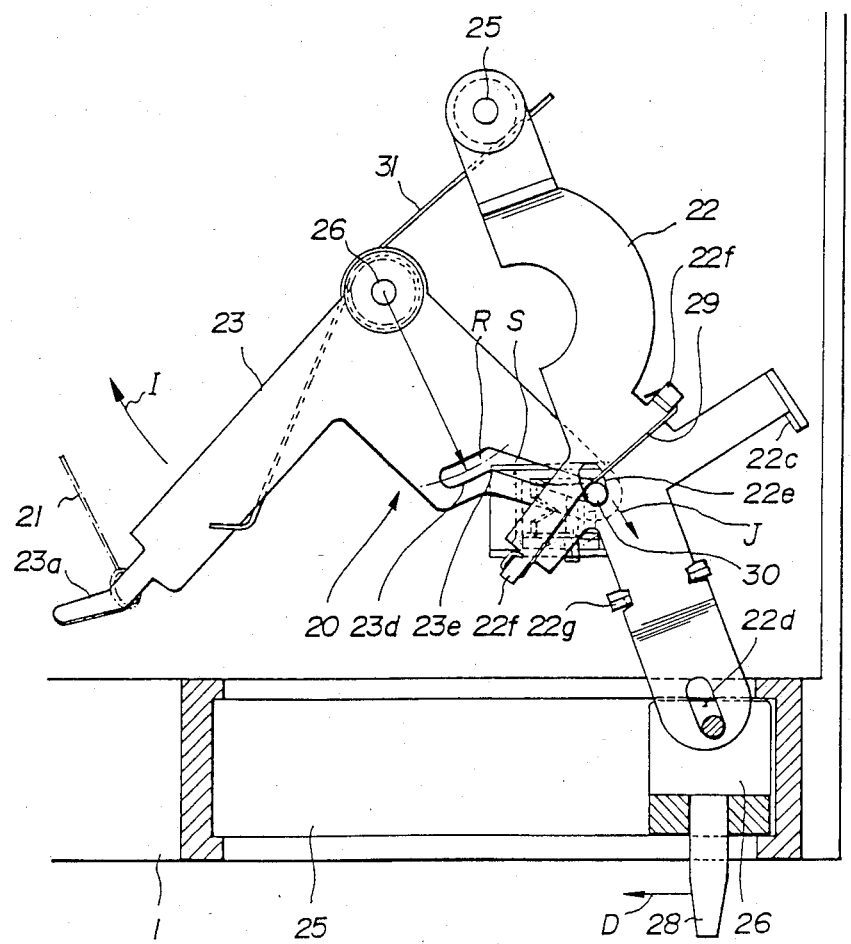
Figure 2:
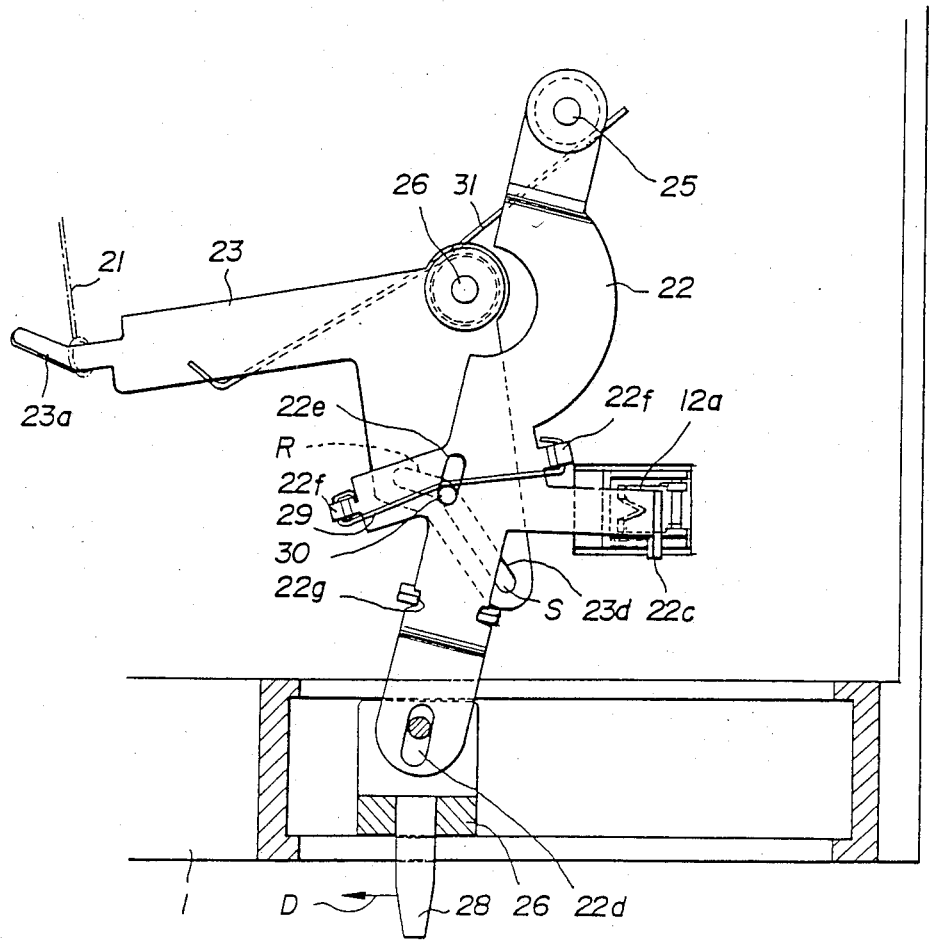
Figure 3:
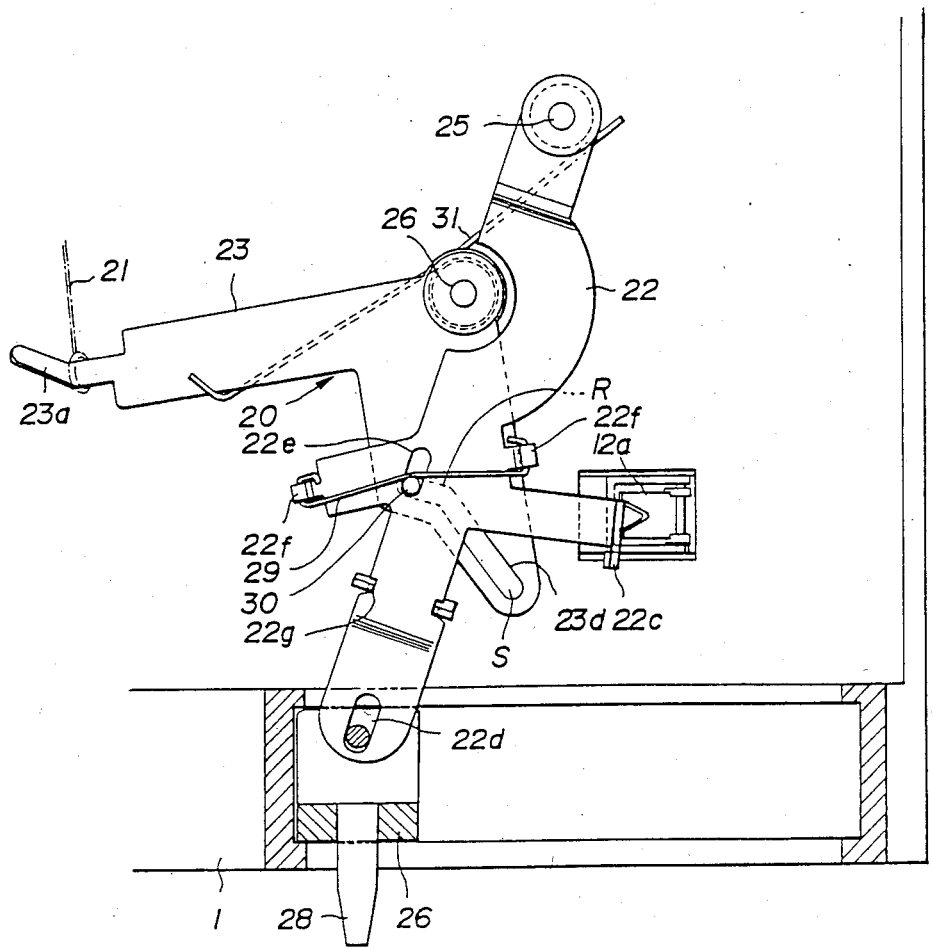
Figure 4:
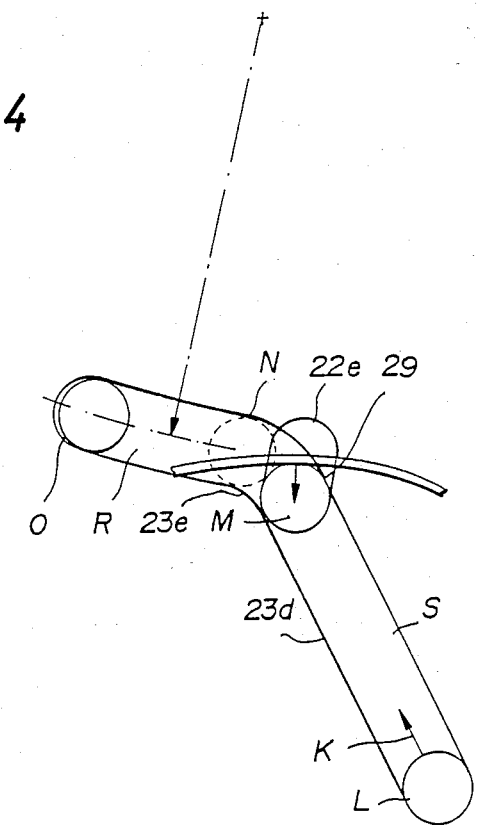
Figure 5:
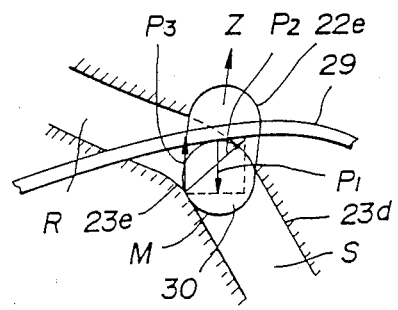
Figure 6:
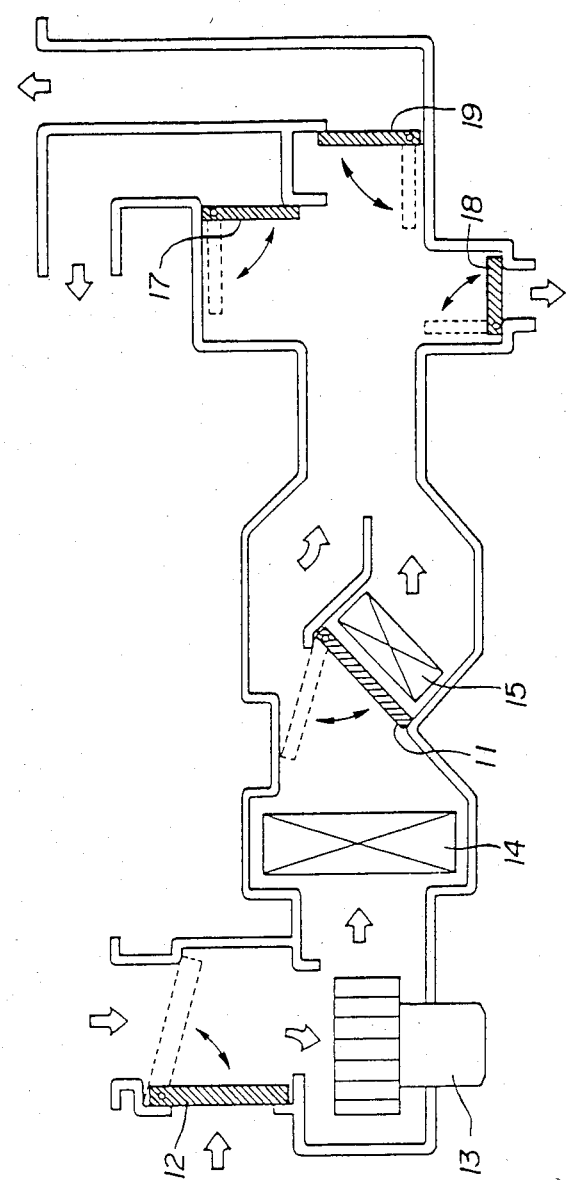
Figure 7:
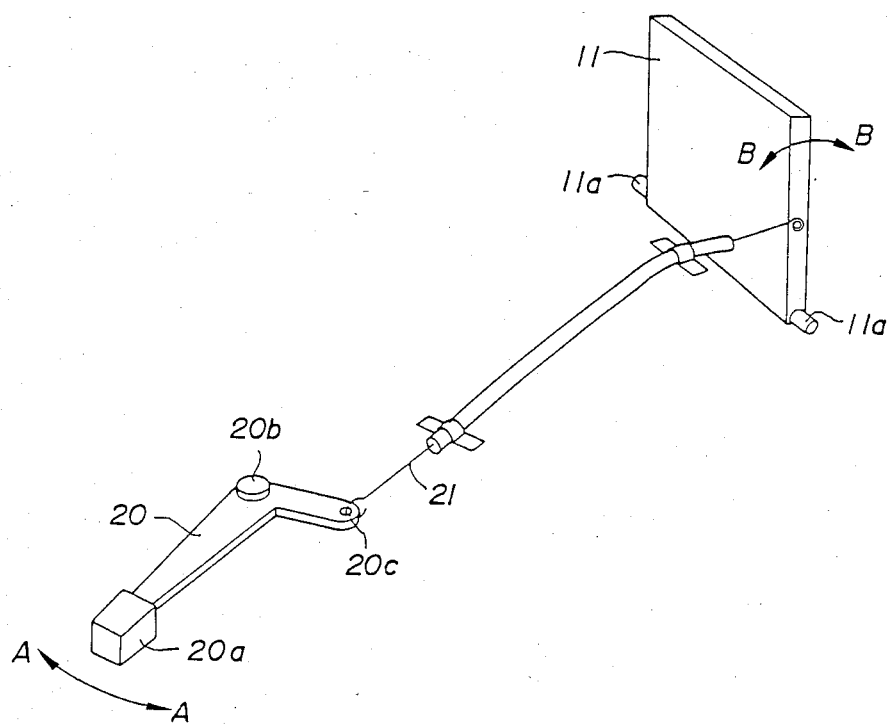
Figure 8:
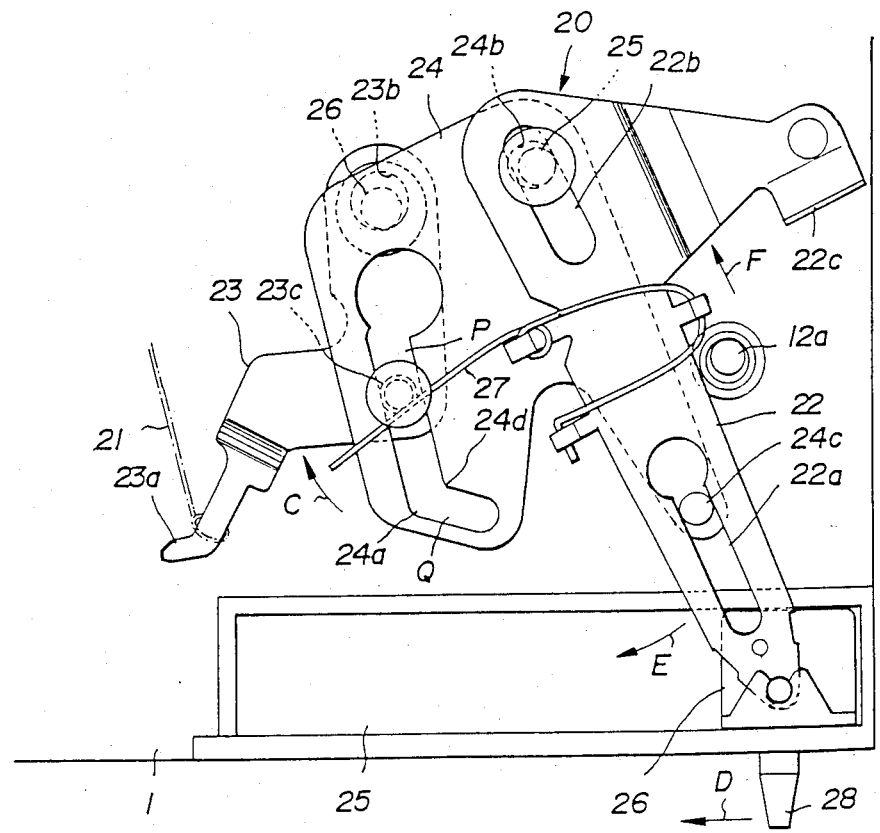
Figure 9:
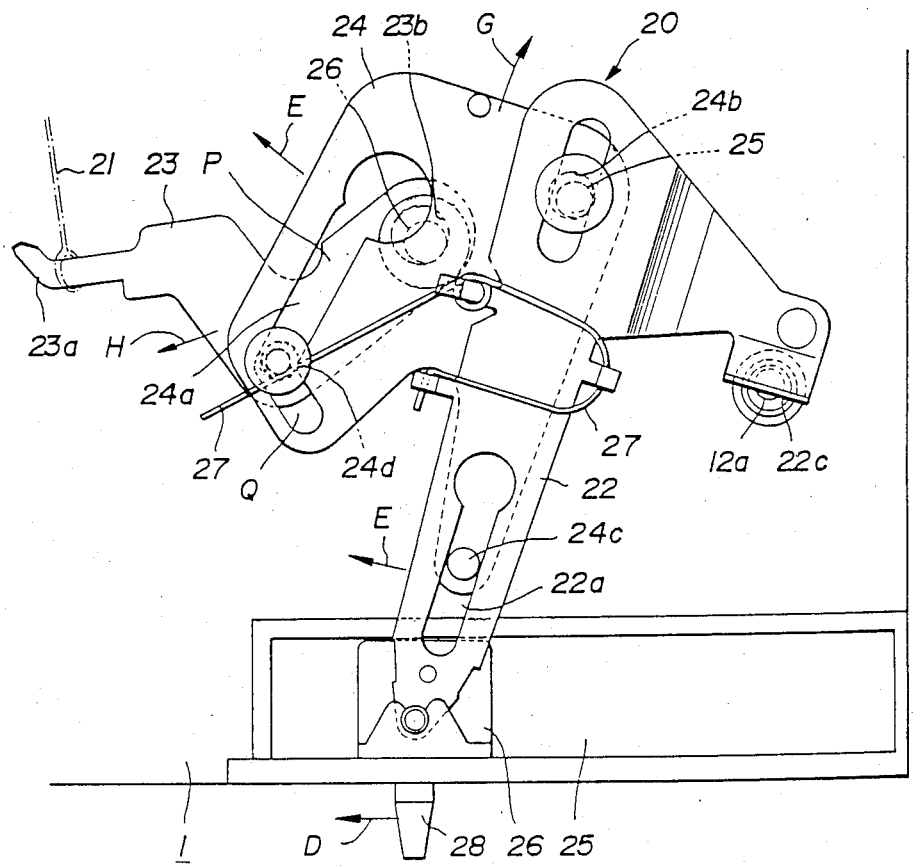
Figure 10:
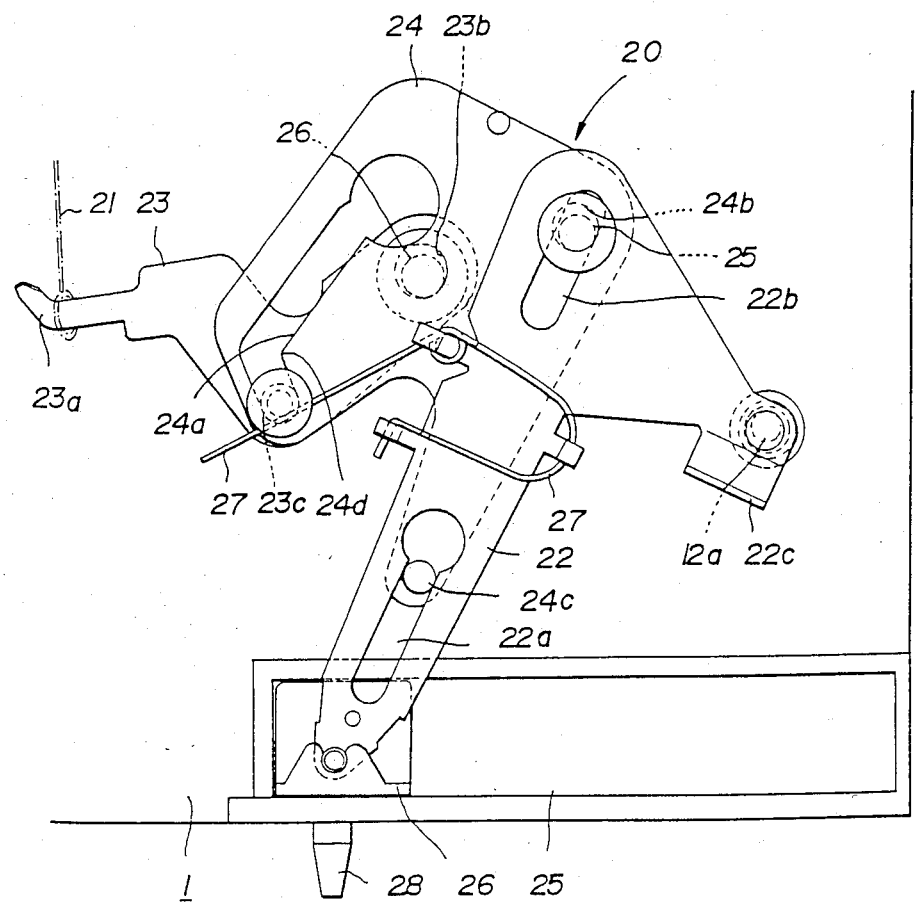
Figure 11A:
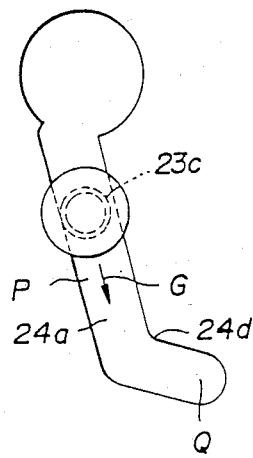
FIGS. 11a, 11b, 11c and 11d are respectively explanatory views showing the relationship between a projection and a guide groove in a conventional air-conditioning control apparatus.
Figure 11B:
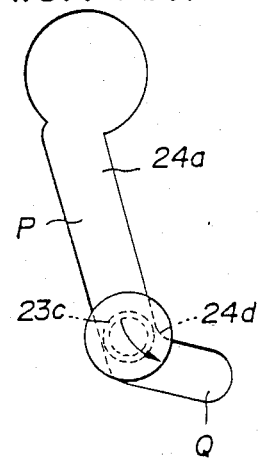
Figure 11C:
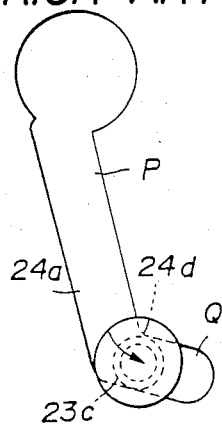
Figure 11D:
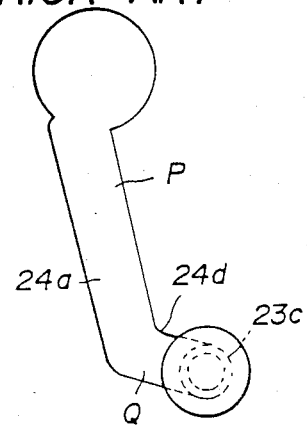

One embodiment of the present invention will now be described with reference to the accompanying drawings, in which FIGS. 1 to 5 illustrate an air-conditioning control apparatus according to the present invention, FIGS. 1 to 3 being respectively plan views of essential parts showing the operation of the air-conditioning control apparatus, FIG. 1 showing the state wherein the air-mixing door 11 is fully opened and the intake door 12 is opened toward the outside air introducing side, FIG. 2 the state wherein the air-mixing door 11 is fully closed and the intake air door 12 is opened toward the outside air introducing side, and FIG. 3 the state wherein the air-mixing door is fully closed and the intake door 12 is opened toward the inside air introducing side, which correspond to FIGS. 8, 9 and 10, respectively. FIGS. 4 and 5 respectively illustrate the principle of the operation. Elements identical with or regarded to be identical with those used in prior art are given the same reference numerals for description.

Referring now to FIGS. 1 to 3, the air-conditioning control apparatus comprises a lever 20, and a slide 26 provided with a projected operating knob 28 which is projected frontwardly of the apparatus body 1, the lever 20 being composed of an operating lever 22 and a traction lever 23.

The operating lever 22 is pivotably mounted on a shaft 25 at one end thereof and is connected to the slide 26 through an engaging groove 22d on the other end thereof, said operating lever 22 being provided in the vicinity of the central portion thereof with a radially slightly lengthy pin insert groove 22e, a switch operating portion 22c projected on the side and a spring engaging portion 22f on which a wire spring 29 is retained. The operating lever 22 is formed on the side where the engagine groove is formed with an engaging groove 22g, on which a member having a similar shape on the whole is engaged. A double construction is provided between the engaging groove 22g and the shaft 25.

The traction lever 23 is formed into a hook on the whole and pivotably mounted on a shaft 26 at a bent portion, said traction lever 23 being provided at one end with an engaging portion 23a on which a wire 21 is engaged and at the other end with a guide groove 23d into which a pin 30 is inserted. A wire spring 31 is mounted on the shaft 26 to always urge the traction lever 23 in a direction as indicated by arrow I.

The guide groove 23d is formed into an L shape on the whole in plane, with a non-operating portion R on the short groove side and an operating portion S on the long groove side as viewed in the figures, in which embodiment, said non-operating portion R is formed to be circular around the shaft 26 whilst the operating portion s is formed to have an angle so that the sliding amount of the operating knob 28 is generally proportional to the opening degree of the air-mixing door 11 actuated by the wire 21.

The portion with the guide groove 23d formed is inserted into the operating lever 22 portion having the double construction, after which a pin is inserted into the guide groove 23d through the pin insert hole 22e, the spring 29 extending between the spring engaging portion 22f in a manner so as to urge the pin 30 in a direction as indicated by arrow J, thus connecting the operating lever 22 with the traction lever 23. Parts not particlarly explained herein are constructed in a manner similar to that of prior art as described above.

The operation of the air-conditioning control apparatus constructed as described above will be described hereinafter.

First, in the state wherein the operating knob 28 is positioned at a position of the maximum temperature of the heater mode, as shown in FIG. 1, the traction lever is pivotally moved counterclockwise at the maximum, the air-mixing door 11 is fully open, and the introduced outside air is guided toward the vehicle compartment passing through the heater core 15. At that time the pin 30 is urged by the force of the wire spring 29 against the inner surface of the pin insert groove 22e on the side of the pin insert groove 22e and is positioned at an L position at the distal end of the operating portion S. When the operating knob 28 is slidably moved from said state to the lower temperature side, that is, in the direction of arrow D, the slide 26 and the operating lever 22 effect linear and rotational movement, respectively, while absorbing a difference of a path between the linear movement and the rotational movement at the engaging groove 22d. During that process, the pin 30 is moved in the direction of arrow K along the operating portion S of the guide groove 23d, and the traction lever 23 is pivotally moved in the urging direction at I (clockwise in the figure) of the wire spring 31 accordingly. The opening degree of the air-mixing door 11 varies according to the pivotal movement of the traction lever 23 so that a part of the introduced outside air passes through the heater core 15 whilst the remaining air is mixed without passing through the heater core 15 and guided toward the vehicle compartment.

When the operating knob 28 is moved in the direction of arrow D till it reaches the position shown in FIG. 2, the heater mode is terminated, whereby the air-mixing door 12 is closed, and only the unheated outside air is introduced toward the vehicle compartment. At this position, the pivotal movement of the traction lever 23 is defined, and the pin 30 is at a position M immdediately before the top 23e of the bent portion between the operating portion S of the guide groove 23d and the non-operating portion R (supposing that the pin 30 moves in the direction of arrow K). Since the pivotal movement of the traction lever 23 is defined at the position M, the operating force increases to let an operator sensitive to the termination of the heater mode.

When the operating knob 28 is further moved in the direction of arrow D from the FIG. 2 position by the greater operating force, the pin 30 is subjected to a reaction $P_2$ from the traction lever 23 as shown in FIG. 5, and when among the components of the reaction $P_2$, a reaction $P_3$ in a direction parallel with that on which the resilient force $P_1$ of the wire spring 29 acts is greater than the $P_1$, the pin 30 moves in the direction of arrow Z along the pin insert hole 22e and gets over the top 23e arriving at the position N of the non-operating portion R. When the pin 30 arrives at the position N, the force from the traction lever 23 rarely acts on the pin 30 since the non-operating portion R is formed into a circular configuration around the shaft 26 of the traction lever 23. As the result, the pin 30 is returned to the original position of the pin insert groove 22e by the force of the wire spring 29 and at the same time reaches the position 0 at the distal end of the non-operating portion R without applying the force to the traction lever 23 along the non-operating portion R. At that time, the operating knob 28 is at the position of the recirculation mode, in which the operating switch 12a of the intake door 12 is pressed by the switch operating portion 22c with the air-mixing door 11 closed to operate the former to switch the intake door 12 toward the inside air introduced side. Thereby, the recirculation of air within the compartment takes place to provide effective cooling.

Also in case of the sliding movement from the recirculation mode to the heater mode, namely, from the operating knob 28 position of FIG. 3 to the operating knob 28 position shown in FIG. 1 through the intermediate position of FIG. 2, when the pin 30 gets over the top 23e, it is displaced in the direction of Z within the pin insert groove 22e to assume the position M of the operating portion S, and the desired mixture ratio may be obtained in correspondence to the amount of displacement thereof in the direction of L.

While in the above-described embodiment, the traction lever 23 is always urged in tbe direction of arrow I by means of the wire spring 31, it is noted that this wire spring 31 is necessary when the operating knob 28 is shifted from the recirculation mode to the heater mode, and the knob 28 need be urged in the direction of arrow I by the force which is greater than the resilient force $P_1$ of the wire spring 29. Otherwise, it becomes impossible to get over the top 23e, and the pivotal movement of the operating lever 25 is impossible at the low temperature portion of the heater mode, for example. This urging force is not always applied by the wire spring 31 but such will suffice to be present in the course from the traction lever 23 to th air-mixing door 11. Thus, the urging means is not limited to the wire spring 31.

As described above, according to the above-described embodiment, it is not necessary to preset a dimensional allowance to the supporting portions of the operating lever 22 and the traction lever 23 relative to the shafts 25 and 26, respectively, and therefore, no play of the operating lever 22 and the traction lever 23 with respect to the shafts 25 and 26, respectively, occurs. The operating lever 2Z and the traction lever 23 are connected through the pin 30. But the pin 30 is urged by the wire spring Z9 in a preset direction so as not to form a clearance between the pin 30, the guide groove 23d and the pin insert groove 22e, and therefore, no possible play occurs in the connection between tbe operating lever 22 and the traction lever 23. Accordingly, when the operating knob 28 is operated, there is no element for bringing forth the play in the path for transmitting the operating force from the operating lever 22 to the air-mixing door 11 through the traction lever 23 and the wire 21, and the operating force of the operating knob 28 may be transmitted to the air-mixing door 11, wbereby tbe variation of tbe actuating force is minimized and the operability is materially enhanced. Moreover, the problem of play has been overcome, and therefore the operating amount (the sliding amount) of the operating knob 28 and the opening degree of the air-mixing door 11 may be corresponded in the ratio of 1 to 1, which makes it possible to select accurate opening degree of the air-mixing door 11. In addition, the principal parts comprise the operating lever 22 and the traction lever 23, and the cam plate 24 is not needed thus simplifying the assembling.

As will be apparent from the foregoing, according to the present invention in which the pins inserted into the pin insert groove formed in the operating lever and the guide groove formed in the traction lever are always urged toward one side of the pin insert groove to connect the operating lever with the traction lever, only the pin may be displaced to get over the top formed when the operating portion and non-operating portion of the guide groove are connected against the urging force being applied. Therefore, no play occurs in the shaft on which the operating lever and the traction lever are mounted or in the connection therebetween, thus stabilizing the operating force with respect to the operating knob to improve the operability. Moreover, since the operating amount of the operating knob and the opening degree of the air-mixing door are to be corresponded in the ratio of 1 to 1, the fine adjustment of the temperature may be very easily carried out.

What is claimed is:

1. An air-conditioning control apparatus for controlling the position of a door between an open position and a closed position remotely by means of an operating lever in an apparatus body, comprising:

said operating lever having one end pivotably supported on a first shaft fixed in the apparatus body, another end swingable in an arc from a first position corresponding to the open position of the door to a second position corresponding to the closed position of the door, and a pin insert groove between said ends extending a short distance in a radial direction along said operating lever relative to said first pivot shaft;

a traction lever having a pivot portion pivotably supported on a second shaft fixed in the apparatus body, an engaging portion spaced from said pivot portion and engaged with connecting means connected at a remote end thereof to the door for opening and closing the door, and a guide groove having an operating portion extending toward said pin insert groove of said operating lever;

a pin member inserted between said pin insert groove and said guide groove to connect said operating lever movably with said traction lever, wherein at said first position of said operating lever, said pin member is at one end of the operating portion of said guide groove and said engaging portion of said traction lever holds the door through said connecting means at the open position, then, as said operating lever is moved toward said second position, said pin member pushes said traction lever so that said engaging portion moves the door through corresponding closing position, and, at said second position, said pin member is at the other end of the operating portion of said guide groove and said engaging portion of said traction lever holds the door at the closed position;

a first urging means mounted on the operating lever for always urging said pin member in the radial direction away from said first pivot shaft toward said other end of the oprating lever; and a second urging means engaging said traction lever for urging it in a direction toward closing the door.

2. An air-conditioning control apparatus according to claim 1, wherein said other end of said operating lever is swingable past said second position to a third position, said guide groove is an L-shape having a non-operating portion extending at an angle from the other end of the operating portion along an arc section of substantially constant radius relative to said second pivot, wherein, when said operating lever is moved from said second position to said third position, said traction lever is not moved and the door remains non-operated in the closed position while another control function is actuated.

3. An air-conditioning control apparatus according to claim 2, having a heater mode in which said above-mentioned door is an air-mixing door for controlling mixing of heated air and cold air supplied from an external source to a compartment, and a recirculation mode in which an air-intake door is moved to close off air supplied from the external source and to recirculate air from the compartment, and further comprising switching means including a switch disposed in one position in said apparatus body for operating the air-intake door in the recirculation mode, and said operating lever having a switch operating portion which actuates said switch when said operating lever is moved to said third position.

4. An air-conditioning control apparatus according to claim 1, wherein said other end of said operating lever is coupled to a control knob extending from said apparatus body which is slidable in a direction tangent to said arc of said operating lever.

5. An air-conditioning control apparatus according to claim 4, wherein said operating portion of said guide groove extends at inclined angles to the radial direction of said pin insert groove and to a radial direction of said tractor lever relative to said second pivot shaft such that the sliding positions of said control knob is proportional to the closing positions of the door.

* * * * *